United States Patent [19]

Pinkerpell et al.

[11] Patent Number: 4,907,018

[45] Date of Patent: Mar. 6, 1990

[54] PRINTHEAD-CARRIAGE ALIGNMENT AND ELECTRICAL INTERCONNECT LOCK-IN MECHANISM

[75] Inventors: David W. Pinkerpell; Larry A. Jackson; J. Paul Harmon; Steve O. Rasmussen, all of Vancouver, Wash.

[73] Assignee: Hewlett-Packard Company, Palo Alto, Calif.

[21] Appl. No.: 275,159

[22] Filed: Nov. 21, 1988

[51] Int. Cl.[4] .............................................. G01D 15/16

[52] U.S. Cl. ............................ 346/139 R; 346/140 R; 400/175; 400/126

[58] Field of Search ............................... 400/126, 175; 346/140 PD, 140 R, 139 R,

[56] References Cited

U.S. PATENT DOCUMENTS

| | | | |
|---|---|---|---|
| 4,703,332 | 10/1987 | Crotti et al. | 346/140 R |
| 4,712,172 | 12/1987 | Kiyohara et al. | 346/140 R |
| 4,736,213 | 4/1988 | Piatt et al. | 346/140 R |
| 4,755,836 | 7/1988 | Ta et al. | 346/139 R |

*Primary Examiner*—B. A. Reynolds
*Assistant Examiner*—Huan Tran
*Attorney, Agent, or Firm*—S. A. Kassatly

[57] ABSTRACT

A printhead cartridge and carriage assembly (10) is provided comprising: a carriage (12); a snap-spring (62) for securing a printing cartridge (14) in postion on the carriage; and an interconnect strip (16) for supplying electrical signals to the cartridge, including a force loading spring pad (24) for urging a portion of the interconnect strip against a portion of the cartridge. The cartridge has top (32), bottom (34), sides (36, 38), front (40) and rear (42) surfaces and includes a printhead (44) on the bottom surface, an electrical contact strip (46) on the back surface connected to the printhead, referencing pads (56) on the side surface, and a lip (64) on the back surface for accepting the snap-spring. Referencing surface (60) are provided for receiving the referencing pads on the cartridge. The spring pad urges the interconnect strip against the electrical contact of the cartridge. The printhead cartridge/carriage assembly of the invention requires only one hand of the operator to both insert and lock the cartridge in position. Further, the cartridge/carriage assembly provides simultaneous alignment of the printhead in the X, Y, and Z directions. Finally, contact between the printhead and the interconnect strip is reliably made each time the cartridge is inserted and locked in position, thereby ensuring proper nozzle firing each time.

11 Claims, 5 Drawing Sheets

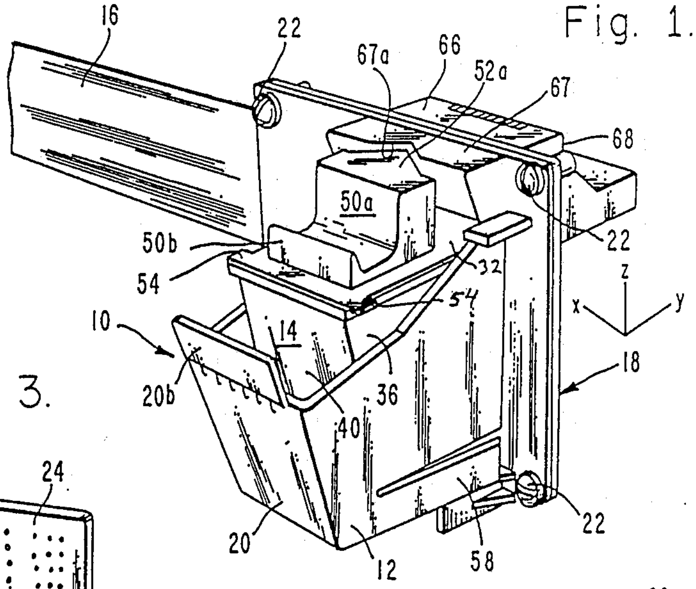
Fig. 1. 1/5
Fig. 3.
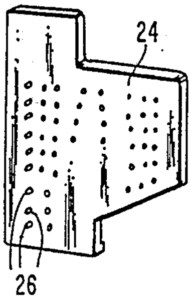
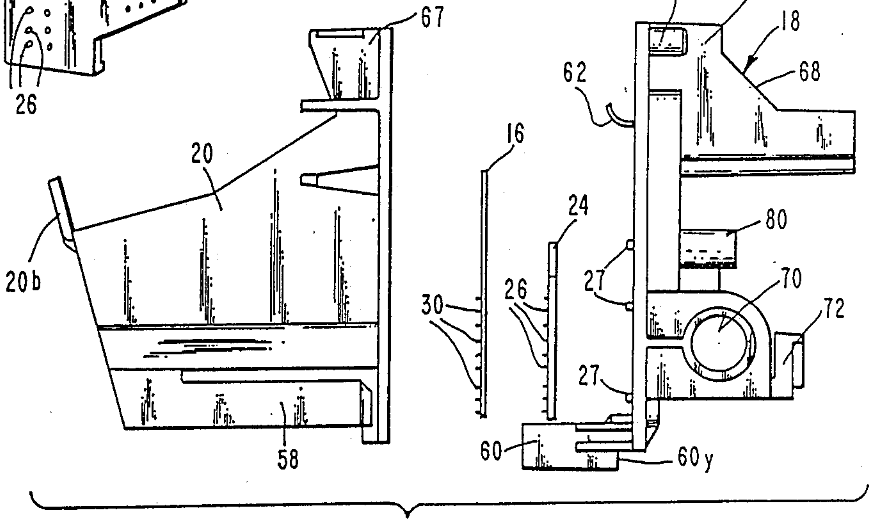
Fig. 2.

Fig. 4.
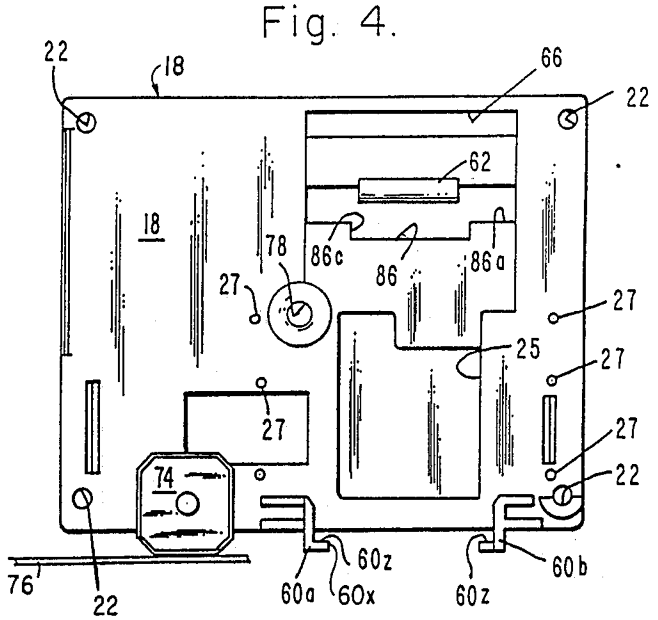
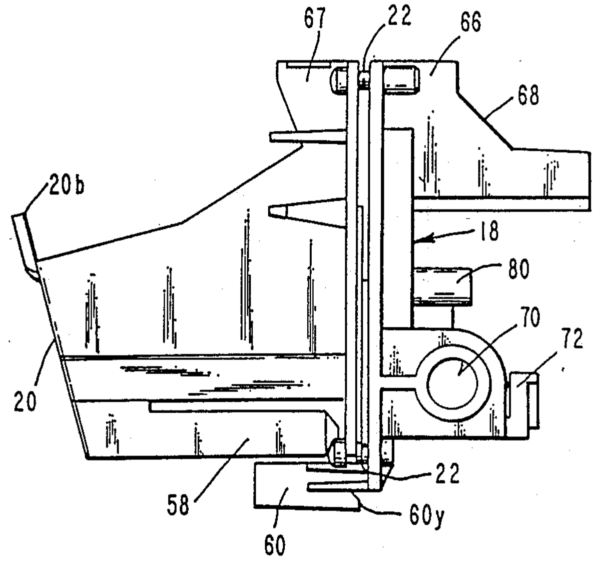
Fig. 5.

PRINTHEAD-CARRIAGE ALIGNMENT AND ELECTRICAL INTERCONNECT LOCK-IN MECHANISM

TECHNICAL FIELD

The present invention relates to ink-jet printers, and, more particularly, to alignment of the printhead and carriage and an electrical interconnect lock-in mechanism for controlling the printhead.

BACKGROUND ART

In ink-jet printing technology, a printhead, comprising a plurality of nozzles in a nozzle plate, is fluidically associated with a reservoir of ink. The printhead is mounted on one end of a print cartridge and the reservoir is provided inside the cartridge. Reference is made to U.S. Pat. No. 4,755,836, issued to Ta et al. on Jul. 5, 1988, and assigned to Hewlett-Packard Company.

An interconnect means is provided, which carries electrical signals from a microprocessor in the printer to the printhead. For thermal ink-jet printers, these signals provide a current to resistors associated with the nozzles and thus control the heating of specific resistors, which in turn form droplets of ink. The droplets of ink are expelled through the nozzles toward a print medium, such as paper. The particular pattern of resistor heating controls the pattern of characters formed on the print medium.

The print cartridge is supported in a carriage, which is adapted to move bidirectionally, normal to the movement of the print medium through the printer. The carriage movement is controlled by a motor and an associated belt drive, with the motor controlled by the microprocessor.

Insertion of an ink-jet cartridge into the carriage often necessitates use of two hands or two operations. Further, many cartridge/carriage configurations do not provide simultaneous alignment of the nozzle plate in the X, Y, and Z directions. Finally, contact between the printhead and the interconnect means must be reliably made, in order to ensure proper nozzle firing.

Accordingly, it is desired to provide a cartridge/carriage assembly that includes the foregoing advantages without the limitations of the prior art.

DISCLOSURE OF INVENTION

In accordance with the invention, a printhead cartridge and carriage assembly is provided comprising:

(a) a carriage;

(b) means for securing a printing cartridge in position in the carriage; and (c) interconnect means for supplying electrical signals to the cartridge, including force loading means for urging the interconnect means against the cartridge.

The cartridge has top, bottom, sides, front and rear surfaces and includes a printhead on the bottom surface, a contact on the back surface connected to the printhead, referencing pads on the side surfaces, and a lip on the back surface for accepting a snap spring for locking the cartridge in position in the carriage. The securing means includes the snap spring and means for receiving the referencing pads on the cartridge. The force loading means urge the interconnect means against the contact of the cartridge.

The printhead cartridge/carriage assembly of the invention requires only one hand of the operator to both insert and lock the cartridge in position. Further, the cartridge/carriage assembly provides simultaneous alignment of the nozzle plate in the X, Y, and Z directions. Finally, contact between the printhead and the interconnect means is reliably made each time the cartridge is inserted and locked in position, thereby ensuring proper nozzle firing each time.

BRIEF DESCRIPTION OF THE DRAWINGS

FIG. 1 is a perspective view of an assembled carriage/cartridge assembly, together with electrical interconnect thereto;

FIG. 2 is an exploded side elevational view showing the assembly of the electrical interconnect and an elastomeric support in the cartridge;

FIG. 3 is a perspective view, partly cut-away, of the elastomeric support;

FIG. 4 is a front elevational view of the carriage;

FIG. 5 is a side elevational view of the carriage, without the cartridge;

Figure 9:
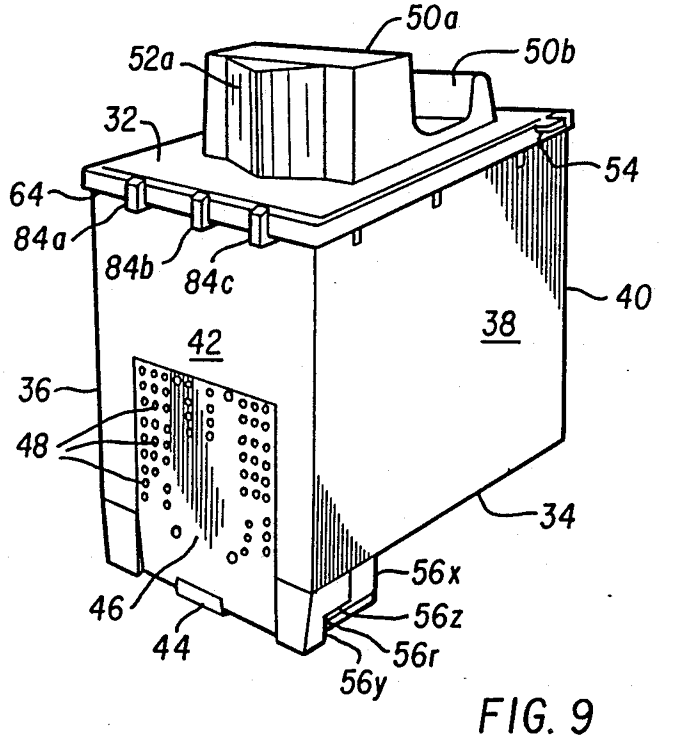
Figure 8:
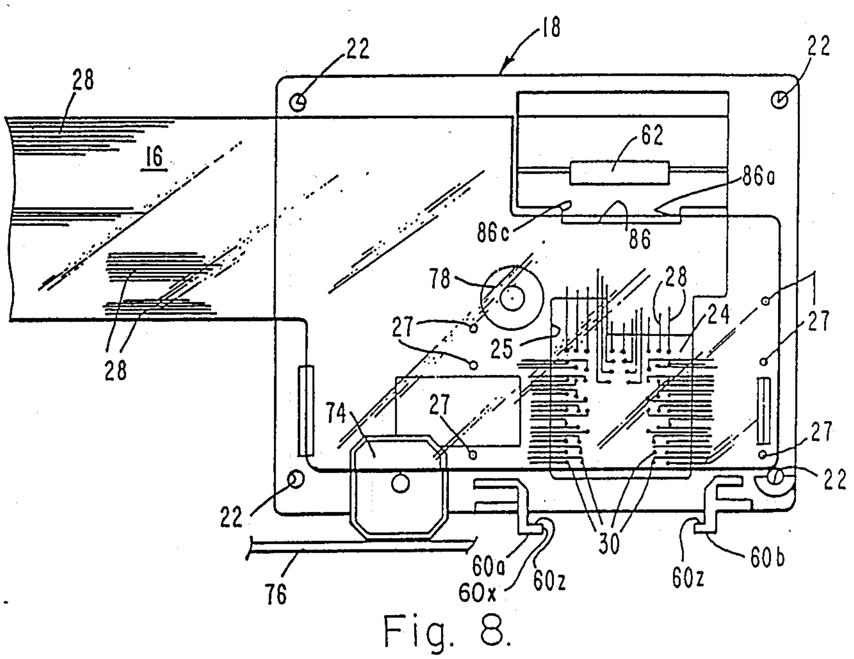
Figure 7:
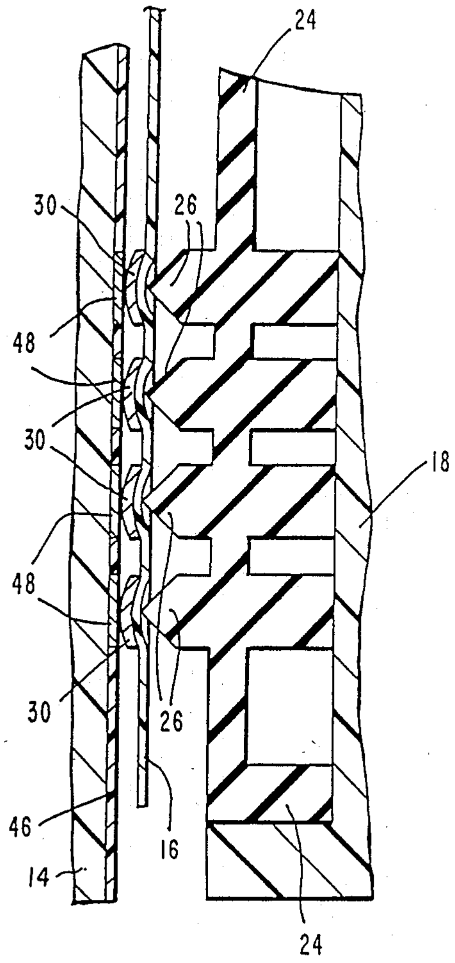
Figure 6A:
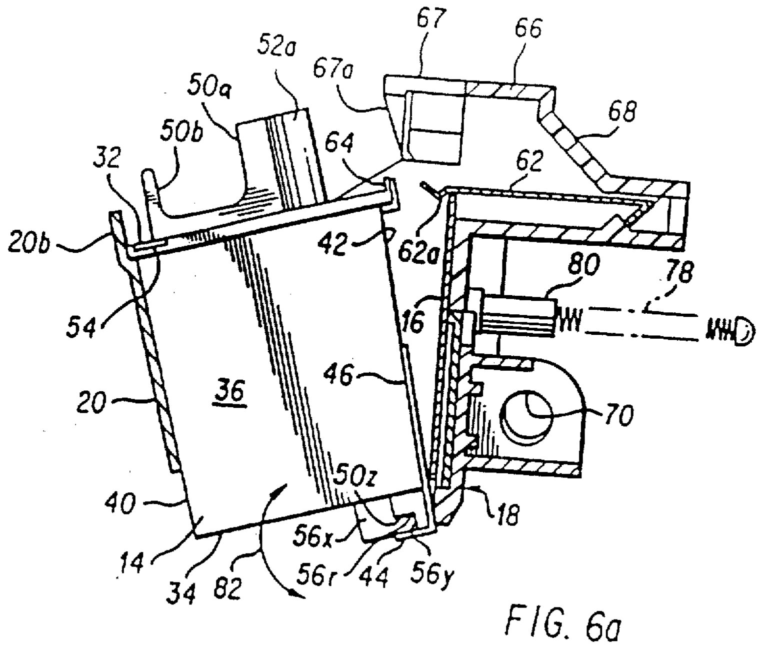
Figure 9:
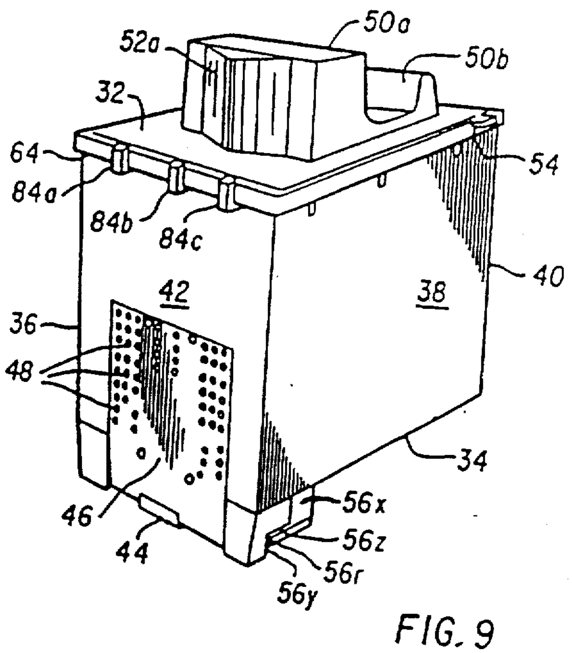

FIG. *6a* is a cross-sectional view of the assembly depicted in FIG. 5, showing the cartridge inserted into the carriage, but not locked into place;

FIG. *6b* is a view similar to that of FIG. *6a*, but showing the cartridge locked in position;

FIG. 7 is a view similar to that of FIG. *6b*, but showing a greatly enlarged view of the electrical interconnect and elastomeric support assembled in the carriage;

FIG. 8 is a side elevational view similar to that of FIG. 4, but with the cartridge chute removed in order to show the positioning of the electrical interconnect in the carriage; and FIG. 9 is a perspective view of the cartridge, showing the printhead electrical contact, which provides electrical connection to the resistors in the printhead, and the reference pads.

BEST MODES OF CARRYING OUT THE INVENTION

Referring now to the drawings wherein like numerals of reference designate like elements throughout, a print cartridge/carriage assembly, denoted generally at 10, is shown in FIG. 1. The assembly 10 comprises a carriage 12 in which a print cartridge 14 is depicted, locked into position. An interconnect strip 16 provides electrical signals from a microprocessor (not shown) to the cartridge 14, as discussed more fully below.

As shown in FIG. 2, the carriage 12 comprises a base support 18 and a chute 20 affixed thereto by fastening means 22. The carriage 12 advantageously comprises a glass-filled, carbon-filled, polytetrafluoroethylene-filled, silicon-filled polycarbonate.

The interconnect strip 16 and a spring pad 24 are sandwiched by the support 18 and chute 20. The spring pad 24 comprises a resilient, elastomeric material and, as seen in FIG. 3, comprises a plurality of resilient bumps 26. The spring pad 24 is seated in a depression 25 (shown in FIG. 4) in the carriage base support 18, behind a portion of the interconnect strip 16, as described more fully below.

The base support 18 and chute 20 are aligned in proper relationship by molded-in features such as pips 27, which engage through corresponding openings in the interconnect strip 16 into opposed openings in the other member.

The interconnect strip 16 comprises a strip of flexible dielectric material, carrying a plurality of electrically conducting lines 28, as seen more clearly in FIG. 8. The conducting lines 28 terminate in convex contact bumps or dimples 30, which are configured in a particular pattern.

The bumps 26 on the spring pad 24 are configured in the same pattern as the contact dimples 30 on the interconnect strip 16. As seen in FIG. 7, the spring pad bumps 26 provide a force loading means against the contact dimples 30 to urge them against the cartridge 14.

The cartridge 14 comprises top 32, bottom 34, sides 36, 38, front 40 and back 42 surfaces. The cartridge 14 advantegeously comprises a modified polyphenylene oxide.

A printhead 44 is provided on the bottom surface 34. The printhead 44 comprises a plurality of resistors (not shown) associated with a plurality of nozzles (not shown) formed in a nozzle plate (not shown). Ink (not shown) is stored in a reservoir interior the cartridge 14.

The cartridge 14 also includes a contact strip 46 on the back surface 42, which wraps around to the bottom surface 34 to provide a plurality of conducting paths or traces to the resistors. In particular, each resistor is supplied by an electrical signal along a unique conducting path. The contact strip 46 includes a plurality of concave contact pads 48, which are arranged in the same pattern as the convex contact dimples 30 on the interconnect strip 16. Locking of the cartridge 14 in the carriage 12, as described in greater detail below, matches up the contact dimples 30 with the contact pads 48, to provide an electrical path from the microprocessor to each of the resistors in the printhead 44.

The contact strip 46 comprises a flexible material having a plurality of electrical traces thereon. Preferably, a tape automated bond (TAB) circuit of the type manufactured and sold by 3M Company (Minneapolis, MN) is employed.

The top surface 32 of the cartridge 14 is provided with a pair of finger grips **50*a*, 50*b*. The larger finger grip 50*a* terminates in a V-shaped member 52*a*, which may be provided with an arrowhead insignia to denote the proper direction of orientation of the cartridge 14. When the cartridge 14 is locked in the carriage 12, the cartridge is received by a similarly shaped surface on the carriage to provide a visual reference for proper orientation. Lock-out ears 54 further act to prevent mis-orientation of the cartridge 14 in the carriage 12**.

Reference pads 56, seen more clearly in FIG. 9, are provided on the cartridge 14 near the base thereof. In particular, two sets of reference pads 56 are provided; these comprise sculpted surfaces that align the nozzle plate in the X, Y and Z directions. The X reference pad **56*x* is a surface parallel to the side surface 38. (There is only one X reference pad 56*x*, since the carriage 12 is provided with a side spring 58 which urges against the opposite side surface 36 to force the cartridge against one side of the chute 20. The Y reference pad comprises the upper vertical surface 56*y* of the sculpted surface. The Z reference pad comprises the inner horizontal surface 56*z* of the sculpted surface. The junction of 56*y* and 56*z* comprises a pivot or rotation point 56*r*, about which the cartridge 14** rotates during the lock-in operation.

Downwardly depending L-shaped members **60*a*, *b* on the support base 18 each cooperatively engage one of the reference pads 56 in mating association. A snap-spring 62 in the upper portion of the chute 20 engages a ledge member 64 on the back surface 42 of the cartridge 14**.

The L-shaped members **60*a*, *b* provide reference surface against which the reference pads 56 of the cartridge bear. In particular, reference pad 56*x* bears against reference surface 60*x* on member 60*a* (the member on the opposite side of the side spring 58). Reference pads 56*y* push back against reference surfaces 60*y* (shown in FIG. 2). Reference pads 56*z* bear down on reference surfaces 60*z***.

The snap-spring 62 is housed in a molded-in feature 66 of the carriage support base 18. A mating housing 67, which sits above the snap-spring 62 when the base 18 and chute 20 are assembled, includes an inward V-shaped surface **66*a*, which receives the similarly-shaped surface 52*a* of the cartridge 14. The rear of the housing 66 comprises a finger grip 68. The front of the cartridge chute 20 is also provided with a finger grip 20*b***.

The support 18 of the carriage 12 includes a bearing 70, which is associated with a carriage rod (not shown). The carriage rod is positioned substantially parallel with the paper drive axis (not shown), and permits bidirectional movement of the carriage 12 therealong. The carriage 12 is moved by a belt (not shown), attached to the carriage by a belt attachment 72. The belt is attached to a carriage drive motor (not shown), which is controlled by the microprocessor.

A reference means, or slider bump, 74 rides on the surface of a carriage guide 76. The weight of the carriage 12 preloads the slider bump 74 against the carriage guide 12, thereby making constant contact. The slider bump 74 comprises a low-friction, long wearing material and may be a separate piece or a molded-in feature of the carriage 12. The slider bump 74 serves to maintain the printhead 44 a constant, fixed distance from the print medium.

The carriage base 18 also includes an interposer arm 78 secured in a shaft 80. The function of the interposer arm is related to mechanically triggering certain features in the service station where the assembly 10 resides in between printing operations, and is not relevant to the invention herein.

The printhead lock-in mechanism is considered unique, since it simultaneously aligns the nozzle plate in the X, Y, and Z directions and aligns, wipes, and loads the contact pads of the electrical interconnect strip 16. This is accomplished with no additional bail, latch or lever arm, as seen on other ink-jet printers. The alignment of the nozzle plate and the loading of the interconnect strip 16 occurs when the user rotates the cartridge 14 in the direction of the arrow 74 (FIG. 6*a*), about the pivot point **56*r*. The user does this by squeezing the cartridge thumbhold 50*a* and the carriage finger hold 68** between the thumb and forefinger.

Before the user can squeeze the cartridge 14 into its locked-in position, the user must be able to easily drop the cartridge into the carriage chute 20. The springs 58, 62 which align the cartridge 14 do not apply any force to the cartridge until the cartridge begins to rotate into the locked-in position (shown in FIG. 6*b*). This leaves an unobstructed path for the user to easily drop the cartridge 14 into the pre-rotation position, depicted in FIG. 6*a*. However, the side-kicker spring 20 applies light force when inserting the cartridge 14.

The cartridge 14 rotates about the reference pads 56, specifically, point **56*r*. As the user rotates the cartridge 14, the alignment functions are performed before the electrical interconnect strip 16 is loaded. First, one side 36 of the cartridge 14 engages the molded-in carriage side spring 58. This spring 58 references the cartridge 14** in the X direction by pushing the cartridge sideways until the X reference pad 56*x* is touching the X reference pad 60*x* on the cartridge. The result is an accurate, no slop alignment of the nozzle plate in the X direction.

The next action to occur is the alignment in the Z direction. As the rear ledge 64 of the cartridge 14 encounters the rear metal snap-spring 62, the spring pushes the cartridge in the Z direction until the Z reference pads 56*z* are in contact with the Z reference pads 60*z* on the carriage 12. The result is an accurate, no slop registration of both the electrical interconnect 16 and the nozzle plate in the Z direction.

As the cartridge 14 continues to rotate about the rotation point 56*r* into position, the electrical interconnect concave contact pads 48 on the cartridge contact 46 get wiped slightly by the convex contact dimples 30 on the carriage interconnect strip 16. This offers improved reliability over the dimpled interconnect on prior art printers, because the oxides and contamination are wiped off the contacts 30 and 48 before the interconnect 16 is loaded.

The wiping action is followed by the alignment of the cartridge electrical contact pads 48 in the X direction. This occurs when the cartridge's outer rear heel lock tabs 84*a, c* engage the sides 86*a, c* of the heel lock slot 86 on the carriage 12. The interconnect strip 16 on the carriage 12 is referenced accurately to the heel lock slot 86 by pins 27, thereby providing the required alignment of the interconnect strip to the cartridge's electrical contact pads 48. The contact strip 46 is fastened, such as by glue or adhesive, to the cartridge 14 and is referenced by an assembly machine.

Finally, the cartridge 14 is aligned accurately in the Y direction. The electrical interconnect's rubber spring pad 24 on the carriage 12 must be deflected the proper distance in the Y direction in order to maintain the required contact force. In the back 42 of the cartridge 14, the rubber spring 24 pushes back against the electrical contacts 30 and 48 so that the Y reference pads 56*y* on the cartridge contact the Y reference pads 60*y* on the carriage. This maintains the necessary force on the contact pads 48 located on the contact strip 46, on the rear surface 42 of the cartridge 14. This also provides an accurate Y registration of the nozzle plate as well as controlling the rotational alignment of the nozzles.

At the top 32 of the cartridge 14, the required contact force in the Y and Z directions is maintained by the rear snap-spring 62. As the cartridge 14 rotates into the locked-in position, the rear lip 64 of the cartridge 14 deflects the rear spring-snap 62 and passes over an over-center point 62*a* (FIG. 6*a*) on the snap-spring. The snap-spring 62 is designed to apply about 70% of its force in the Y direction. This is the force required to maintain the electrical interconnect 16 in the rear 42 of the cartridge 14.

As the cartridge 14 passes the over-center point 62*a* on the rear snap-spring 62, the cartridge makes an audible "snap", signalling to the user that the cartridge is in the proper locked-in position. The force of the rubber interconnect spring pad 24 is adequate to hold the cartridge into its accurately aligned position under the large accelerations and shock loads the cartridge encounters in normal printing operations.

To remove the cartridge 14 from the carriage 12, the user simply rotates the cartridge by squeezing the cartridge finger hold 50*b* and the cartridge thumb hold 20*b* between the thumb and forefinger. The rear ledge 64 on the carriage 14 deflects the rear snap-spring 62 until the cartridge over-centers into the unlocked position. There is an audible "snap" which tells the user that the cartridge 14 can now be lifted out of the carriage 12 for disposal.

INDUSTRIAL APPLICABILITY

The print cartridge/carriage assembly disclosed herein is suitably employed in ink-jet printers, particularly thermal ink-jet printers.

Thus, there has been disclosed an ink-jet print cartridge/carriage assembly which is easily assembled and disassembled, with reproducibly accurate registration of the cartridge in the carriage. Various changes and modifications of an obvious nature will be readily apparent to those of ordinary skill in this art, and all such changes and modifications are considered to fall within the scope of the invention, as defined by the appended claims.

What is claimed is:

1. A printhead carriage lock-in assembly (10) for use with a cartridge (14) in a printer, for printing on a print medium, comprising:

a. carriage means (12);

b. said carriage means including base support means (18) for receiving the cartridge;

c. said base support means depending into referencing means (60*a*, 60*b*), for aligning the cartridge in proper printing position along at least two directions;

d. said base support means further including retention means (62) for causing the cartridge to be locked in position relative to said carriage means;

e. electrical interconnect means (16, 24, 46), for supplying control signals to the carriage;

f. the cartridge including a reference system (56) corresponding to, and generally coordinating with, said referencing system of said base support means, for providing proper alignment to the cartridge during its positioning relative to said carriage means, and for causing the cartridge to be retained in position during the printing operation;

g. said referencing means including a pair of downwardly depending, spaced-apart, generally oppositely disposed L-shaped members (60*a*, 60*b*), for engaging said reference system of the cartridge;

h. the cartridge including a rear ledge (64), and said retention means including spring means (62) for engaging said rear ledge in order to retain the cartridge in a locked position;

i. the cartridge further including a top portion (32), a bottom portion (34), and printhead means (44) generally secured to said bottom portion; and j. said reference system (56) of the cartridge including two sets of similar pads (56*x*, 56*y*, 56*z*), generally disposed near said bottom portion in a substantially symmetrical relationship relative to said printhead means;

k. said reference pads (56*x*) abutting one of said L-shaped members (60*a*);

l. said reference pads (56*y*) abutting the other L-shaped member (60*b*); and m. the cartridge further including lock-out ear means (54), slightly protruding outwardly from said top portion (32), for enhancing the orientation of the cartridge inside said carriage means.

2. A printhead carriage lock-in assembly for receiving a cartridge having electrical contacts (46, 48), a reference system (56) and a plurality of print elements, the print elements being disposed out of the plane of the electrical contacts, the printhead carriage lock-in assembly comprising:

a. carriage means;

b. said carriage means including base support means for receiving the cartridge;

c. said base support means depending into referencing means (60a, 60b), for aligning the cartridge into a proper printing position along at least two directions (x,y);

d. said referncing means generally coordinating with the reference system of the cartridge, for providing proper alignment to the cartridge during its positioning relative to said carriage means, and for causing the cartridge to be retained in position during the printing operation;

e. electrical interconnect means, for supplying control signals to the cartridge electrical contacts; and f. said electrical interconnect means being disposed out of the plane of the cartridge electrical contacts to avoid obstructing the firing path of the print elements onto a print medium, to minimize contamination of said electrical interconnect means resulting from the firing of the print elements, and to allow for a desirable relatively close spacing between the print elements and the print medium.

3. The assembly as defined in claim 2, wherein said referencing means includes a pair of downwardly depending, spaced-apart, generally oppositely disposed L-shaped members (60a, 60b), for engaging said reference system of the cartridge.

4. The assembly as defined in claim 3, further including retention means (62) for causing the cartridge to be locked in position relative to said carriage means; and wherein the cartridge includes a rear ledge (64), and wherein said retention means includes spring means (62) for engaging said rear ledge in order to retain the cartridge in a locked position.

5. The assembly as defined in claim 4, wherein said carriage means further includes chute means (20), secured to said base support means (18), for helping guide the cartridge in position.

6. The assembly as defined in claim 4, wherein the cartridge further includes a top portion (32), a bottom portion (34), and printhead means (44) generally secured to said bottom portion;

wherein said reference system (56) of the cartridge includes two sets of similar pads (56x,56y, 56z), generally disposed near said bottom portion in a substantially symmetrical relationship relative to said printhead means;

wherein said reference pads (56x) abut one of said L-shaped members (60a); and wherein said reference pads (56y) abut the other L-shaped member (60b).

7. The assembly as defined in claim 5, wherein said electrical interconnect means includes an interconnect strip (16), disposed intermediate said base support means and the cartridge, and terminating in a plurality of dimples (30) disposed in a predetermined arrangement, for effecting electrical contact with the cartridge.

8. The assembly as defined in claim 7, wherein the cartridge contacts include a contact strip (46) having a plurality of electrically conducting pads (48) disposed in a predetermined array for effecting electrical contact with said interconnect strip (16);

wherein the cartridge includes a plurality of resistors; and wherein said contact strip (46) provides a plurality of conducting paths to said resistors generally terminating in said conducting pads.

9. The assembly as defined in claim 8, further including spring pad means (24) disposed intermediate said base support means (18) and said interconnect strip (16), for forcing said interconnect strip against the cartridge, in order to maintain a good electrical interconnection therebetween.

10. The assembly as defined in claim 9, wherein said spring pad means includes a plurality of externally protruding bumps (26); and wherein said bumps are disposed in a generally similar arrangement to that of said dimples (30) and said conducting pads (48) and in registration therewith, such that said bumps force said dimples against said conducting pads, in order to maintain a good electrical contact between said interconnect strip and the cartridge.

11. A printhead carriage lock-in assembly (10) for use with a cartridge (14) in a printer, for printing on a print medium, comprising:

a. carriage means (12);

b. said carriage means including base support means (18) for receiving the cartridge;

c. said base support means depending into referencing means (60a,60b), for aligning the cartridge in proper printing position along at least two directions;

d. said base support means further including retention means (62) for causing the cartridge to be locked in position relative to said carriage means;

e. electrical interconnect means (16, 24, 46), for supplying control signals to the carriage;

f. the cartridge including a reference system (56) corresponding to, and generally coordinating with, said referencing system of said base support means, for providing proper alignment to the cartridge during its positioning relative to said carriage means, and for causing the cartridge to be retained in position during the printing operation;

g. said referencing means including a pair of downwardly depending, spaced-apart, generally oppositely disposed L-shaped members (60a, 60b), for engaging said reference system of the cartridge;

h. the cartridge including a rear ledge (64), and said retention means including spring means (62) for engaging said rear ledge in order to retain the cartridge in a locked position;

i. said carriage means further including chute means (20) secured to said base support means (18), for helping guide the cartridge in position; and said chute means including spring means (58) for applying a relatively light force against the cartridge, to help guide its alignment and positioning inside said chute means.

* * * * *

UNITED STATES PATENT AND TRADEMARK OFFICE
CERTIFICATE OF CORRECTION

PATENT NO. : 4,907,018

DATED : March 6, 1990

INVENTOR(S) : David W. Pinkerpell [sic - Pinkernell]; Larry A. Jackson; J. Paul Harmon; Steve O. Rasmussen It is certified that errors appear in the above-identified patent and that said Letters Patent is hereby corrected as shown below:

On cover page: change both occurrences of "Pinkerpell" to --Pinkernell--.

On cover page, insert: --[63] Continuation of Ser. No. 07/113,101, Oct. 23, 1987, abandoned.--.

Column 1, line 5, insert: --The present application is a continuation of application Serial No. 07/113,101 filed on October 23, 1987, entitled "Printhead-Carriage Alignment and Electrical Interconnect Lock-In Mechanism," now abandoned.--.

Signed and Sealed this

Fourth Day of November, 1997

*Attest:*

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 4,907,018

DATED : Mar. 6, 1990

INVENTOR(S) : David W. Pinkernell, et al

It is certified that error appears in the above-identified patent and that said Letters Patent is hereby corrected as shown below:

The title page, showing the illustrative figure, should be deleted and substitute therefor the attached title page.

Figure 6A:
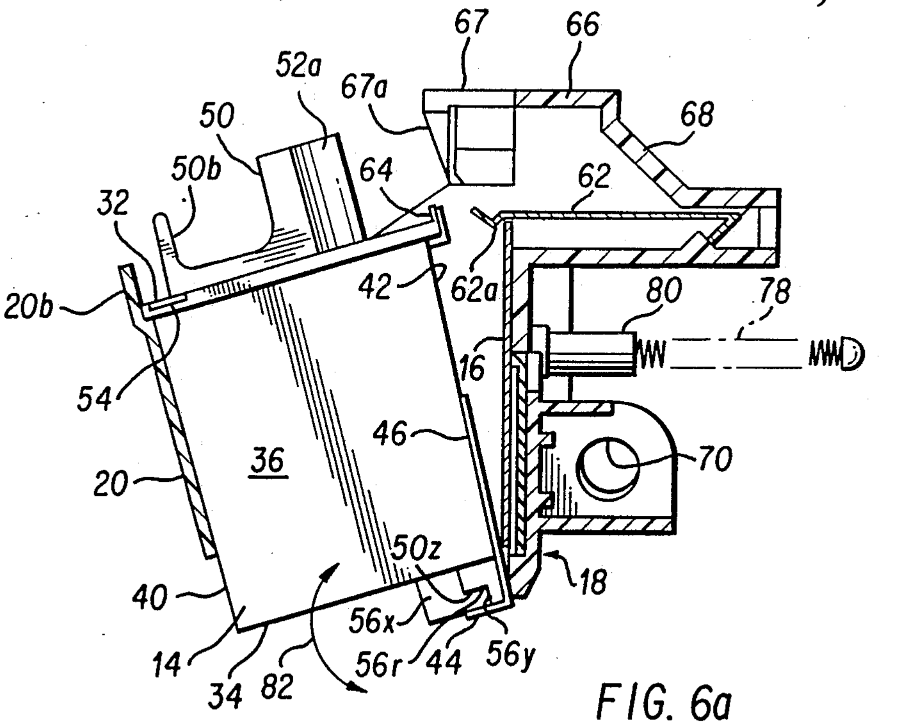
Figure 6B:
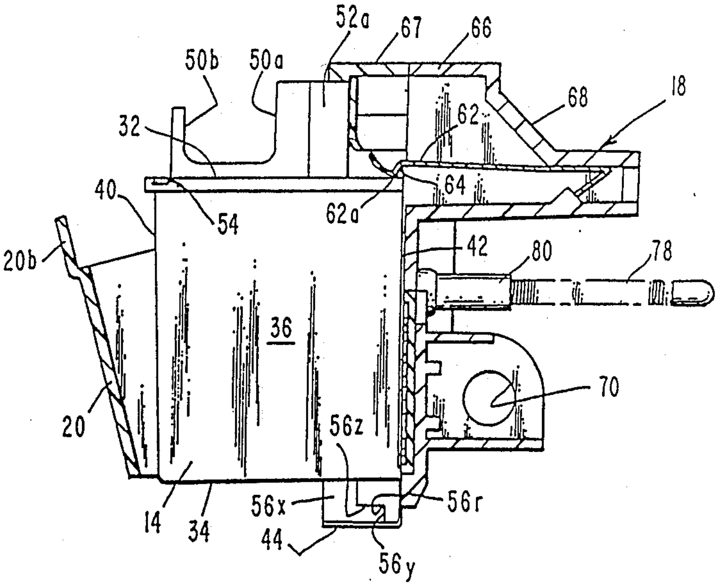

The drawing sheet, consisting of Fig. 6a and Fig. 9, should be deleted to be replaced with the drawing sheet, consisting of Fig. 6a and Fig. 9, Signed and Sealed this Third Day of March, 1998

Attest:

Bruce Lehman

BRUCE LEHMAN

Attesting Officer

*Commissioner of Patents and Trademarks*

United States Patent [19] | [11] Patent Number: 4,907,018
Pinkernell et al. | [45] Date of Patent: Mar. 6, 1990

[54] PRINTHEAD-CARRIAGE ALIGNMENT AND ELECTRICAL INTERCONNECT LOCK-IN MECHANISM

[75] Inventors: David W. Pinkernell; Larry A. Jackson; J. Paul Harmon; Steve O. Rasmussen, all of Vancouver, Wash.

[73] Assignee: Hewlett-Packard Company, Palo Alto, Calif.

[21] Appl. No.: 275,159

[22] Filed: Nov. 21, 1988

[51] Int. Cl.[4] ............ G01D 15/16
[52] U.S. Cl. ............ 346/139 R; 346/140 R; 400/175; 400/126
[58] Field of Search ............ 400/126, 175; 346/140 PD, 140 R, 139 R,

[56] References Cited

U.S. PATENT DOCUMENTS

| | | | |
|---|---|---|---|
| 4,703,332 | 10/1987 | Crotti et al. | 346/140 R |
| 4,712,172 | 12/1987 | Kiyohara et al. | 346/140 R |
| 4,736,213 | 4/1988 | Piatt et al. | 346/140 R |
| 4,755,836 | 7/1988 | Ta et al. | 346/139 R |

*Primary Examiner*—B. A. Reynolds
*Assistant Examiner*—Huan Tran
*Attorney, Agent, or Firm*—S. A. Kassatly

[57] ABSTRACT

A printhead cartridge and carriage assembly (10) is provided comprising: a carriage (12); a snap-spring (62) for securing a printing cartridge (14) in postion on the carriage; and an interconnect strip (16) for supplying electrical signals to the cartridge, including a force loading spring pad (24) for urging a portion of the interconnect strip against a portion of the cartridge. The cartridge has top (32), bottom (34), sides (36, 38), front (40) and rear (42) surfaces and includes a printhead (44) on the bottom surface, an electrical contact strip (46) on the back surface connected to the printhead, referencing pads (56) on the side surface, and a lip (64) on the back surface for accepting the snap-spring. Referencing surface (60) are provided for receiving the referencing pads on the cartridge. The spring pad urges the interconnect strip against the electrical contact of the cartridge. The printhead cartridge/carriage assembly of the invention requires only one hand of the operator to both insert and lock the cartridge in position. Further, the cartridge/carriage assembly provides simultaneous alignment of the printhead in the X, Y, and Z directions. Finally, contact between the printhead and the interconnect strip is reliably made each time the cartridge is inserted and locked in position, thereby ensuring proper nozzle firing each time.

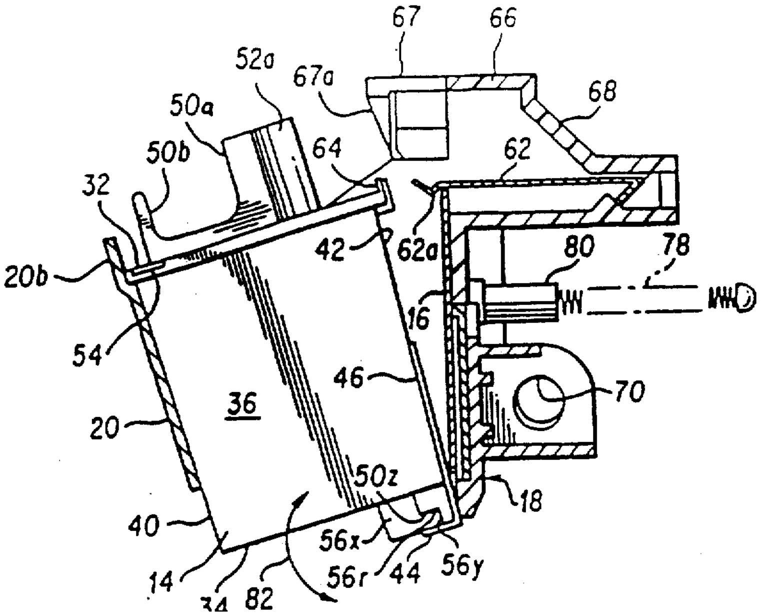

11 Claims, 5 Drawing Sheets